R. A. B. WALSH.
METHOD OF AND MACHINE FOR MAKING WIRE GLASS.
APPLICATION FILED MAY 22, 1907.

940,834.

Patented Nov. 23, 1909.

Attest:
J. C. Mitchell
C. L. Ashley

Inventor:
Robert A. B. Walsh
by Bakewell Cornwall
Attys.

UNITED STATES PATENT OFFICE.

ROBERT A. B. WALSH, OF ST. LOUIS, MISSOURI, ASSIGNOR TO MISSISSIPPI GLASS COMPANY, OF ST. LOUIS, MISSOURI, A CORPORATION OF MISSOURI.

METHOD OF AND MACHINE FOR MAKING WIRE-GLASS.

940,834.  Specification of Letters Patent.  Patented Nov. 23, 1909.

Application filed May 22, 1907. Serial No. 375,112.

*To all whom it may concern:*

Be it known that I, ROBERT A. B. WALSH, a citizen of the United States, residing at St. Louis, Missouri, have invented a certain new and useful Improvement in Methods of and Machines for Making Wire-Glass, of which the following is a full, clear, and exact description, such as will enable others skilled in the art to which it appertains to make and use the same, reference being had to the accompanying drawings, forming part of the specification, in which—

Figure 8:
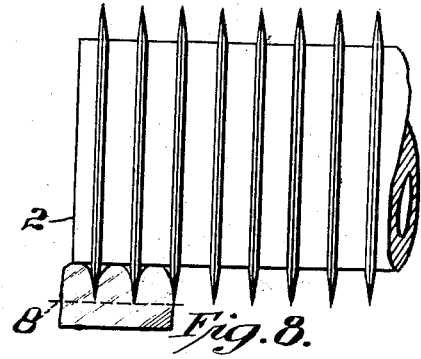

Figures 1, 2, 3, 4, 5, 6 and 7 are side elevations of different forms of apparatus which may be used in practicing my invention. Fig. 8 is a conventional illustration of the embedding roller.

This invention relates to a new and useful method of, and machine for making wire glass, and particularly wire glass in which a plurality of layers are employed to form the ultimate sheet.

The object of my invention is to produce a sheet of glass having smooth brilliant surfaces, the wire of said sheet retaining its original bright and new appearance after it has been embedded in the glass.

In the manufacturing of wire glass, the tendency of the wire is to contract and "draw" the glass so as to produce an uneven or irregular surface. It has been proposed, see for illustration the patent to Walsh No. 610,593, dated Sept. 13, 1898, to cure these irregularities by smoothing them down by a finishing roller; but this cannot always be successfully accomplished, because, while the finishing roller acts upon the elevations, it will not perfectly transfer the surplus glass to the depressions and make a perfect weld. It has also been proposed, see for illustration the Schmertz reissue patent No. 12,443, dated Jan. 30, 1906, to press the wire mesh into the top surface of a first formed sheet of glass, and then spread a finishing layer or sheet of molten glass thereover. This method produces a better and smoother finish to the top surface than the Walsh method first mentioned. In both of these methods, the wire, on account of its exposure to atmosphere after being heated loses its bright and new appearance and looks black in the finished sheet. In the Schmertz method the weld between the two layers occurs principally in the plane of the wire, and as the wire is at places left free to "draw" this action is sometimes observed on the surface of the second layer.

Briefly stated, my present invention contemplates the method of and apparatus for forming a sheet of glass having wire buried beneath its surface, which sheet of glass may be produced either by the Walsh method or the Schmertz method referred to, and in applying and welding to the uneven sheet of glass with its contained wire mesh, a finishing coating or layer of glass.

In the preferred method of practicing my invention, the wire mesh is embedded in the first formed sheet at the time that said sheet is being made so that in its heated condition the wire will not be exposed to atmosphere and will preserve its bright and new appearance in the glass.

It is obvious from the foregoing, that my invention is not limited to a single type of machine, but may be embodied in different forms of apparatus. I have shown several of these forms in the accompanying drawings, and will first refer to Fig. 1, in which there is a table 1, having an embedding roller 2, arranged above the upper surface thereof, and a smooth-surface roller 3, arranged adjacent the embedding roller but farther away from the table. A guide roller 4, is also provided for guiding the wire mesh that is interposed between the two layers.

In practicing my invention with apparatus of this description, a wire mesh 5 is arranged underneath the embedding roller and a ladle-full of molten glass 6 is dumped on the table underneath said wire mesh and roller. At the same time another ladle-full of molten glass 7 is dumped on the table underneath the smooth roller 3, and the table is then moved longitudinally in the direction of the arrow in Fig. 1, thereby causing the roller 2 to form the mass of molten glass 6 into a bottom layer 8, and the roller 3 to form the mass 7 into a top layer 9 and combining said two layers together. The roller 2, due to the embedding blades thereon, will force the wire mesh below the upper surface of the bottom layer simultaneously with forming said layer so that said wire mesh will be completely covered by glass and thus prevent it from oxidizing, as would be apt to occur if it were exposed to the air while in its heated condition.

Figure 1:
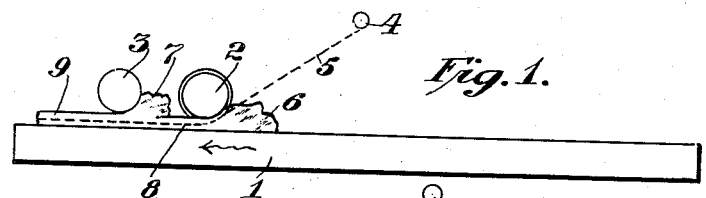

Although I have previously stated that the table was moved longitudinally, it will of course be understood that the table could be stationary and the rollers moved longitudinally thereof without departing from the spirit of my invention. If desired, the bottom layer can be formed between two rollers, the one which acts upon the upper surface being provided with embedding blades, and the top layer being formed and combined with the bottom layer in the same manner as shown in Fig. 1.

Figure 2:
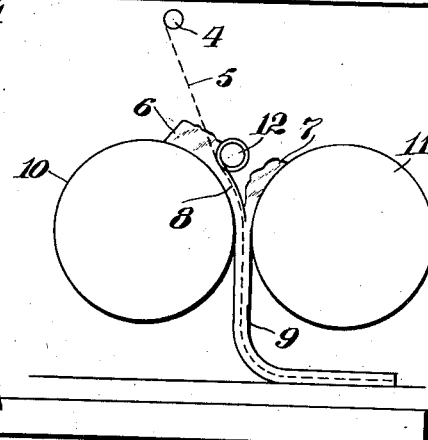

In Fig. 2 I have shown another form of apparatus which can be used for carrying out my invention, this apparatus consisting of two smooth-surface rollers, 10 and 11, arranged apart the distance which it is desired the thickness of the finished sheet shall be, and an embedding roller 12 coöperating with the roller 10 to form a bottom layer and bury the wire mesh therein. Instead of having the embedding roller 12 coöperate with the roller 10 to form the bottom layer 8, said roller can coöperate with a supplemental roller, and the two rollers 10 and 11 be used simply to form the top layer and combine it with the bottom layer.

Figure 3:
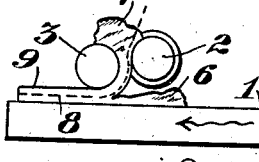

Although I have stated that the wire mesh is embedded in the bottom layer, it is obvious that it could be embedded in the underneath surface of the top layer, and in practice I prefer to form the glass sheets in this way. The apparatus which I use when the mesh is embedded in the top layer is practically the same as those previously described and is shown in Fig. 3. Referring to said figure it will be seen that the top layer is formed by a smooth-surface roller 3 and a coöperating embedding roller 2 which embeds the wire mesh in the underneath surface of said top layer, and the bottom layer being formed and combined with the top layer by means of the table 1 and roller 3.

Figure 4:
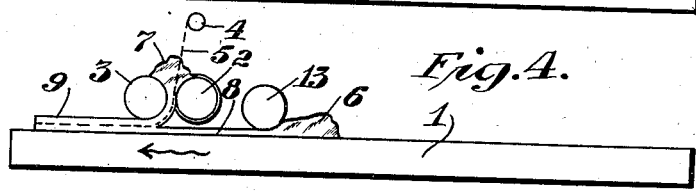

In the various forms of apparatus above described one of the layers is formed simultaneously with the operation of combining the two layers together, but if desired a portion of each layer can be completely formed before the layers are combined together; for example, by the apparatus shown in Fig. 4. The only difference between this apparatus and that shown in Fig. 3 is that a roller 13 coöperates with the table 1 to form the bottom layer, but if desired the bottom layer can be formed between two rollers instead of a single roller and the table. An apparatus similar to that shown in Fig. 2 can also be used, in this form a roller being provided for coöperating with each of the rollers 10 and 11 to progressively form portions of each layer before they are combined together by said rollers 10 and 11, or, if desired, the two separate masses of glass can be pressed between sets of small rollers to progressively form the two layers, which are thereafter combined together by the two rollers 10 and 11. While it is preferable to embed the wire mesh in one of the layers by positive pressure, such as is produced by an embedding roller, it is, of course, possible to so arrange the wire mesh that it will cut its way into the molten glass during the process of rolling it into layer form, this being produced by having the wire mesh pass through tension rollers.

Figure 5:
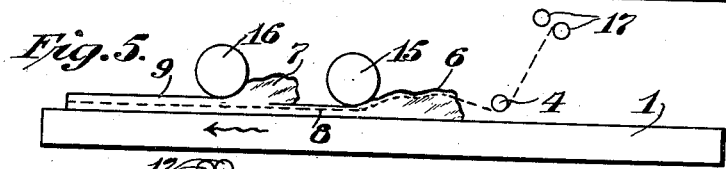

In Fig. 5 I have shown an apparatus for accomplishing this, which apparatus is substantially the same as that shown in Fig. 1, except that the rollers 15 and 16 have smooth surfaces and tension rolls 17 are provided through which the wire mesh travels and thence under the guide roller 4. By arranging the tension rolls above the rollers 15 and 16 and approximately between them, and introducing the end of the wire mesh between the bottom layer and the mass 7 of molten glass, which forms the top layer, the wire mesh will cut its way into the top layer simultaneously with the formation of same. Practically the same form of apparatus as that shown in Fig. 4 can also be used except that tension rollers are used in place of the guide roller 4 and a smooth-faced roller substituted for the embedding roller 2, the tension rollers of course being so arranged that the wire mesh will cut its way into the mass 7 of molten glass.

Figure 6:
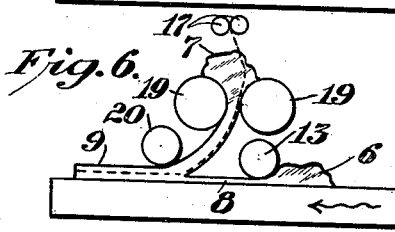

In Fig. 6 is shown another form of apparatus in which the top layer is formed between two smooth-faced rollers 19, the wire mesh passing between tension rolls 17 and thus cutting its way into the underneath face of said top layer while it is being formed, the bottom layer being formed by the table 1 and a roller 13, the two layers being combined together by roller 20 coöperating with the table.

Figure 7:
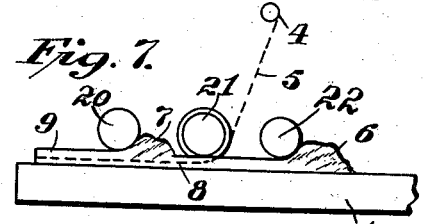

In Fig. 7 there is an advance spreading roller 20 for initially rolling the glass into sheet form, a following embedding roller 21, and a roller 22, which latter spreads the finishing layer.

It will be observed from the above that a complete sheet of wire glass is first formed, to wit—a sheet of glass with wire buried beneath its surface and finally a finishing roller spreads a finishing coating, layer or sheet of glass over the uneven surface of the previously made sheet, the finishing coating of molten glass filling in the spaces and becoming thoroughly welded in the first formed sheet. Thus the tendency of the wire to "draw" the glass in contracting, and produce an irregular or uneven surface on the first formed sheet, is corrected by the second coating which not only fills out any unevenness in the first formed sheet, but said last applied coating or second layer more readily partakes of, and retains the smooth even surface imparted by the finishing roller.

By referring to Fig. 8 it will be noted that the embedding roller marked 2 is provided with embedding blades which are preferably made thin, deep and tapering to a knife edge so that they will have the least amount of surface contact with the wire to be embedded. These embedding blades are also spaced as far apart as is practicable and yet sufficiently close together so that they will uniformly bury the wire beneath the surface of the first formed sheet.

From the above it will be noted that the embedding roller which I propose to use is not a corrugating roller in the sense that said term is usually understood in this art, particularly with respect to the manufacture of "wash-board" glass. An ordinary "corrugating roller" that is, one whose contour is in the shape of a sinusoidal curve and which is used to make glass plates for use in wash-boards would not answer the purposes of an embedding roller to perform the functions of an embedding roller illustrated in Fig. 8, for the reason that the corrugations as a general rule are too close together and present too large an area for surface contact with the wire, in consequence of which the wire would not be embedded or buried beneath the surface, but would merely occupy a position where it would be exposed between the protuberances formed by such a corrugating roller. The exposure of the wire to the atmosphere after the wire is heated by contact with the glass, is what I seek to avoid. The complete burying of the wire beneath the surface of the first formed sheet is what I seek to do, and this is done by the embedding blades of the roller 2.

By reference to Fig. 8 it will be seen that the glass does not entirely fill the spaces between the embedding blades and thus there are left on the surface of the sheet soft or unchilled protrusions, which have not been in contact with the metal of the embedding roller.

This application is a continuation of an application filed by me September 19, 1906, serially numbered 335,242.

I am aware of the United States patents to Locke Nos. 656,295 and 656,296, dated August 21, 1900, wherein it is proposed to first form a layer of glass with wire in its upper surface and thereafter pour a dump of glass on the rear end of the first formed layer, rolling said second dump into layer form over the first layer but in a reverse direction to the movement of said roll in forming the first layer.

My invention differs from that disclosed in the Locke patent in the following essential particulars: The second dump of glass is poured on the forward end of the first formed layer; there are two rolls one for each dump, instead of a single roll such as Locke uses; and, finally, the finishing layer is spread on the first formed sheet before said first formed sheet is entirely formed. Thus it might be said that the second or finishing layer, according to my improvement, is spread upon the first formed layer simultaneously, or at the same time that the first formed layer is being formed. Of course, it will be understood in actual practice that after pouring the first dump, the forward roller forms the front end of a sheet of glass, and as the second layer approaches the front edge of the first formed sheet, the second dump is made, and the first and second layers are then simultaneously formed, the two rollers having peripheral movement in the same direction. The first formed sheet is of course completed first, but a continued movement of the rear roller will spread the second dump into a finishing layer over the rear end of the first formed sheet.

I do not in this application specifically claim several of the modifications herein illustrated and described, as the same form subject-matter of divisional applications, serially numbered 404,844, 404,845, 404,846, 404,847 and 404,850, filed by me December 2, 1907.

Having thus described my invention, what I claim is:—

1. An apparatus of the character described comprising means for making a complete sheet of wire glass, in combination with means for finishing said sheet by welding a layer or coating of glass thereto before the first-mentioned sheet is entirely formed; substantially as described.

2. An apparatus of the character described comprising means for making a sheet of glass having wire buried beneath its surface, in combination with means for finishing said sheet by welding a layer or coating of glass thereto before the first-mentioned sheet is entirely formed, substantially as described.

3. An apparatus of the character described comprising means for forming a sheet of glass and simultaneously forcing a wire mesh below one surface thereof, and means for spreading a mass of molten glass over said surface and smoothing it to form a finished sheet before the first-mentioned sheet is entirely formed, substantially as described.

4. An apparatus for making wire glass, the same comprising means for rolling a mass of molten glass into sheet form, means for forcing a wire mesh into one face of said sheet so that it is completely covered, and thereafter covering that face of said sheet in which the wire mesh is embedded with a layer of molten glass before the first-mentioned sheet is entirely formed, substantially as described.

5. An apparatus for making wire glass, the same comprising means for simultaneously rolling a plurality of masses of molten glass into layer form, forcing a wire mesh below the surface of one of said layers so that it is completely covered, and thereafter combining said layers into a single sheet, substantially as described.

6. An apparatus for making wire glass, comprising means for forming a mass of molten glass into sheet form, means for embedding a wire mesh adjacent to one surface of said sheet, and means for covering said adjacent surface with a finishing layer of glass before the first-mentioned sheet is entirely formed, substantially as described.

7. An apparatus of the character described comprising means for making a sheet of glass having wire buried beneath its surface, one surface of said sheet also having regularly spaced protrusions on its surface, and means for forming another sheet of glass and welding said other sheet of glass to the protrusion-bearing surface before the first-mentioned sheet is entirely formed; substantially as described.

8. The method of making wire glass consisting in forming a complete sheet of wire glass and in finishing said sheet by welding a layer or coating of glass thereto before the first-mentioned sheet is entirely formed, substantially as described.

9. The method of making wire glass consisting in forming a sheet of glass having a wire buried beneath its surface, and in finishing such sheet by welding a layer or coating of glass thereto before the first-mentioned sheet is entirely formed, substantially as described.

10. The method of making wire glass consisting in forming a sheet of glass, embedding wire therein, and in forming another sheet of glass and welding the same to said first formed sheet before the first-mentioned sheet is entirely formed, substantially as described.

11. The method of making wire glass consisting in forming a sheet of glass and simultaneously forcing a wire mesh below one surface thereof, and spreading a mass of molten glass over said surface and smoothing it to form a finished sheet before the first-mentioned sheet is entirely formed, substantially as described.

12. The method of making wire glass consisting in simultaneously rolling a plurality of masses of molten glass into layer form, introducing a wire mesh below the surface of one of said layers so that it is completely covered, and combining said layers into a single sheet before the first-mentioned sheet is entirely formed, substantially as described.

13. The method of making wire glass consisting in forming a mass of molten glass in sheet form, embedding a wire mesh adjacent to one surface of said sheet, and covering said adjacent surface with a finishing layer of glass before the first-mentioned sheet is entirely formed, substantially as described.

14. The method of making wire glass which consists in forming a sheet of glass with wire mesh embedded therein and finishing such sheet of glass by applying another layer of molten glass thereto before the first-mentioned sheet is entirely formed, the weld between said layer and said sheet being on a plane different from the plane of the embedded wire, substantially as described.

15. The method of making wire glass which consists first in making a complete sheet of glass with wire buried beneath its surface, and finally applying a finishing layer to the uneven surface of the first formed sheet before the first-mentioned sheet is entirely formed and while said first formed sheet is in a condition to readily weld with the finishing layer, substantially as described.

16. The method of making wired glass which consists in rolling a mass of molten glass into sheet form and simultaneously forcing a wire mesh below the surface of said sheet so that it is completely covered, and thereafter covering that surface of the sheet into which the wire mesh was forced with a layer of glass and subjecting the same to pressure, substantially as described.

17. The method of making wired glass which consists in simultaneously rolling a plurality of masses of molten glass into layer form, forcing a wire mesh below the surface of one of said layers so that it is completely covered, and thereafter combining said layers into a single sheet, substantially as described.

18. The method of making wired glass which consists in simultaneously forming a mass of molten glass into a layer, forming a separate mass of molten glass into another layer and simultaneously forcing a wire mesh into the underneath surface thereof so that it is completely covered, and therafter combining said layers together to form a single sheet, substantially as described.

19. An apparatus of the character described comprising means including a roller for making a complete sheet of wire glass, in combination with means including a roller for finishing said sheet by welding a layer or coating of glass thereto, both of said rollers having a peripheral movement in the same direction; substantially as described.

20. An apparatus of the character described comprising two rollers having peripheral movement in the same direction, one of said rollers first forming a sheet of glass, means for embedding the wire beneath the surface of said sheet of glass, and the second of said rollers spreading a finishing layer of glass upon the first formed sheet and before said first formed sheet is entirely formed; substantially as described.

21. A machine for making wire glass, the combination with a table, a plurality of rollers arranged above said table, both of said rollers having the same relative movement with respect to said table in the longitudinal direction thereof, the forward roller spreading a pour of glass in advance thereof in sheet form, means for embedding a wire mesh beneath the surface of said first formed sheet, and another of said rollers spreading a second pour of glass over said first formed sheet and before said first formed sheet is entirely formed; substantially as described.

22. The herein described method of making wire-glass which consists in forming a sheet of glass with a web of wire buried beneath its surface and within its body, and in spreading upon the uneven surface of such sheet when newly formed a final finishing layer of glass.

23. In a machine for making wire-glass, the combination with means for forming a sheet of glass having a web of wire buried beneath its surface and within its body, of means for spreading upon the surface of such sheet a final finishing layer of glass.

24. The herein described method of making wire glass, consisting in spreading molten glass into sheet form, arranging wire mesh upon one surface thereof, crowding the glass constituting said sheet onto said wire mesh, and then spreading upon the uneven surface of said sheet a finishing layer or coating of glass.

25. The method of making wire glass which consists in rolling molten glass into sheet form, introducing a wire mesh thereto, simultaneously displacing the surface glass on one side of said sheet, and then spreading upon the uneven surface of said sheet a finishing layer or coating of glass.

26. The method of making wire glass which consists in spreading molten glass into sheet form, introducing wire mesh into one surface of said sheet at the time it is being formed, simultaneously crowding the glass adjacent the surface through which the wire mesh is introduced onto and over the said wire mesh, and then spreading upon the uneven surface of said sheet a finishing layer or coating of glass.

27. The method of making wire glass which consists in spreading molten glass into sheet form, introducing a wire mesh into said sheet, and at the same time longitudinally displacing the surface glass on one side of said sheet, and then spreading upon the uneven surface of said sheet a finishing layer or coating of glass.

28. The method of making wired glass which consists in rolling a mass of molten glass into sheet form and forcing a wire mesh below the surface of said sheet so that it is completely covered, and thereafter covering that face of said sheet in which the wire mesh is embedded with a layer of molten glass; substantially as described.

29. The method of making wired glass which consists in rolling a mass of molten glass into a layer, and drawing a wire mesh beneath one surface thereof so that it is completely covered, and thereafter covering that surface of the layer with a mass of molten glass and rolling the same to produce a finished sheet; substantially as described.

30. The herein described method of making wired glass which consists in forming a sheet of glass with a web of wire buried beneath its surface and within its body, and in spreading upon the uneven surface of such sheet when newly formed a final finishing layer of glass.

31. In a machine for making wired glass, the combination with means for forming a sheet of glass having a web of wire buried beneath its surface and within its body, of means for spreading upon the surface of such sheet a final finishing layer of glass; substantially as described.

In testimony whereof I hereunto affix my signature in the presence of two witnesses this twentieth day of May, 1907.

ROBERT A. B. WALSH.

Witnesses:
 WELLS L. CHURCH,
 GEORGE BAKEWELL.